3,413,201
ELECTROLYTIC RECORDING SHEETS
Ralph Lewis Clausen, South St. Paul, Minn., assignor to Minnesota Mining and Manufacturing Company, St. Paul, Minn., a corporation of Delaware
Filed Sept. 10, 1965, Ser. No. 486,510
15 Claims. (Cl. 204—18)

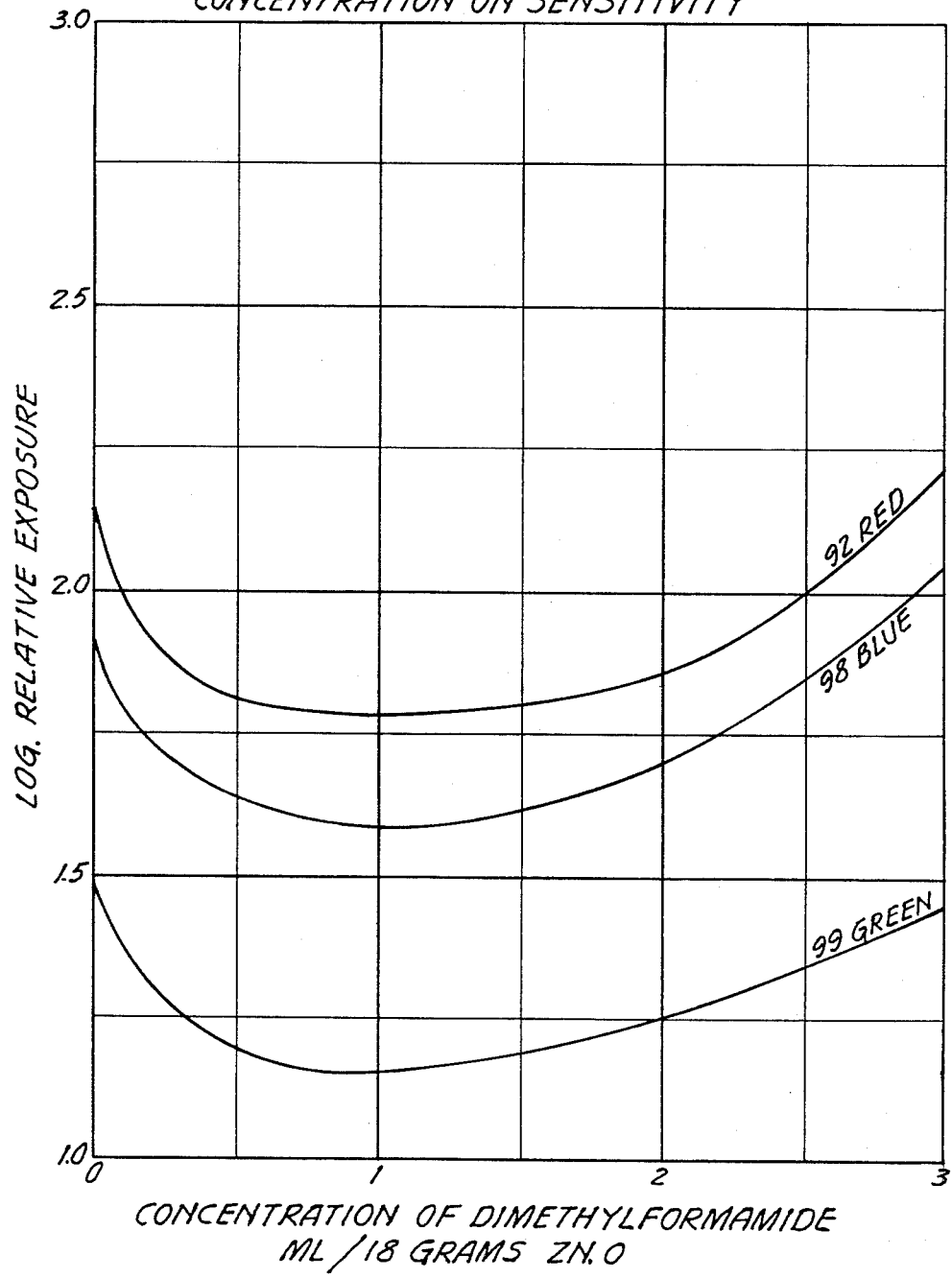

This invention relates to electrophotographic copysheets and their preparation. In one aspect this invention relates to electrolytic electrophotographic copysheets having improved sensitivity.

Strongly photoconductive copysheets are employed in various electrophotographic processes, including electrolytic electrophotographic processes and electrostatic electrophotographic processes. In the electrolytic electrophotographic process, as described in U.S. Patent No. 3,010,883, an image is produced on a photoconductive copysheet by the electrodeposition of a developer material selectively onto the light exposed surface areas thereof. Strongly photoconductive copysheets suitable for the above method are described in U.S. Patent No. 3,010,884. To improve the sensitivity of photoconductive copysheets the use of various dye sensitizers have been suggested. In general, such dye sensitizers are dissolved in a suitable solvent, conventionally methanol, and are admixed with the inorganic photoconductive material, e.g., zinc oxide powder, prior to copysheet preparation, generally accomplished by coating an admixture of photoconductive powder and an insulating binder onto a suitable support. Such techniques are shown in U.S. Patent Nos. 3,051,569, 3,052,540 and 3,153,591. Dye sensitization in conjunction with chemical modification of the surface of zinc oxide for use in an electrostatic copysheet is disclosed in U.S. Patent No. 3,197,307. Other techniques capable of improving the sensitivity of photoconductive compositions and photoconductive copysheets prepared therefrom have been sought.

It is an object of this invention to provide improved photoconductive copysheets useful in electrolytic electrophotography.

Still another object of this invention is to provide dye sensitized electrolytic electrophotographic copysheets having improved sensitivity.

A further object of this invention is to provide a photoconductive composition which can be used to prepare electrolytic electrophotographic copysheets of improved sensitivity.

In accordance with this invention it has been found that the light sensitivity of inorganic photoconductive materials, such as zinc oxide, indium oxide, etc., which are capable of dye sensitization can be significantly improved, usually by an order of magnitude or more, by contacting the photoconductive material either before, during or after dye sensitization with a carbonyl compound of the formula

where R is hydrogen or methyl, R' is hydrogen, methyl or ethyl and R" is methyl or ethyl, the amount of this compound being maintained within the range of about 0.25 to 2 milliliters per 18 grams of the inorganic photoconductor. Particularly preferred of such compounds are dimethylformamide, diethylformamide and dimethylacetamide. These carbonyl compounds are not dye sensitizers per se for such photoconductive materials.

In one technique for the practice of this invention, particularly if the dye sensitizer is soluble in the carbonyl compound, a solution of the dye sensitizer in the carbonyl compound is added to the dispersion of photoconductor in a solution of a suitable electrically insulating organic binder prior to coating the substrate in preparing the photoconductive copysheet. However, the carbonyl compound may also be introduced prior to or after addition of dye sensitizers to the dispersion. Preferably the carbonyl compound is added before the dye sensitizers.

For using the improved zinc oxide dispersions of this invention in the preparation of electrolytic electrophotographic copysheets an electrically conductive substrate is coated with the dispersion. It has been found that relatively small amounts of the carbonyl compound produce a noticeable increase in sensitivity, although at least 0.25 milliliter per 18 grams of zinc oxide is desirable. It has also been found that an amount of the carbonyl compound in excess of 2 milliliters per 18 grams of zinc oxide results in a degradation of sheet properties, causing electrical breakdown of the photoconductive coating during electrolytic development with the formation of developer deposits or "pin holes" in the background, i.e., nonlight exposed, areas of the sheet surface.

As has been indicated earlier, the carbonyl compounds can be used as a solvent for adding other materials, such as dye sensitizers, to dispersions of the inorganic photoconductive compound. Table I shows comparative sensitivity data obtained with the alternative use of dimethylformamide and methanol in zinc oxide dispersions containing various sensitizing dyes. Specifically, the sensitizing dyes were added as 1 milliliter of 0.1% solution of the sensitizing dye in the carbonyl compound to 50 grams of a zinc oxide dispersion in toluene containing 18 grams of zinc oxide (U.S.P. 12) and 3.6 grams of copolymer of stylrene and butadiene (70 weight percent styrene). Aluminum foil laminated to paper was coated on the aluminum side with these dispersions on a knife coater set to provide a 4 mil wet thickness. Sensitivity measurements were made by exposing the coated sheets for 20 seconds through a calibrated $\sqrt{2}$ density step wedge with a filtered light source. The image was then electrolytically developed for 1 second at 20 volts D.C. using a 1 to 2 weight percent developer solution of a cationically charged dyestuff of the type described in U.S. Patent Nos. 3,178,826 and 3,178,827, the aluminum foil in the copysheet being connected as the cathode. The number of steps visible in the resulting print represents a measure of the relative senstivity. After evaluating a wide variety of dye sensitizers of differing chemical structure, the utility of the carbonyl compound in enhancing sheet sensitivity has not been found to be dependent on the particular dye sensitizer selected, although variations in the degree of enhancement are observed.

Table I

| Example | Dye Sensitizer | Sensitivity Methanol | Sensitivity Dimethylformamide | Increase |
|---|---|---|---|---|
| 1 | Rhodamine G (Color Index No. 45150) | 10 | 14 | +4 |
| 2 | Methylene Violet (Color Index No. 50205) | 7 | 11 | +4 |
| 3 | Pyronine B (Color Index No. 45010) | 5 | 12 | +7 |
| 4 | Pyronine G (Color Index No. 45005) | 6 | 9 | +3 |
| 5 | Phloxine B (Color Index No. 45410) | 12 | 13 | +1 |
| 6 | Brilliant Sulpho Flavine FFA (Color Index No. 56205) | 3 | 6 | +3 |
| 7 | Alphazurine 2G (Color Index No. 42045) | 5 | 6 | +1 |
| 8 |  | 8 | 13 | +5 |
| 9 |  | <1 | 8 | +8 |

In the figure the effect of incorporating varying amounts of dimethylformamide into a photoconductive zinc oxide copysheet is shown. A zinc oxide dispersion was prepared by ballmilling the following ingredients for eight hours: 2866 grams zinc oxide (U.S.P. 12 grade), 2821 grams toluene, 236 ml. methanol and 2025 grams of a 30 weight percent solution of styrene-butadiene copolymer (Pliolite S-7, 70/30 weight ratio styrene/butadiene). To fifty gram samples of this dispersion was added the specified amounts of dimethylformamide, and the dispersion samples were each similarly panchromatically sensitized with a methanol solution of Brilliant Sulpho Flavine FFA (Color Index No. 56205, blue sensitizer), Phloxine B (Color Index No. 45410, green sensitizer) and Alphazurine 2G (Color Index No. 42045, red sensitizer). The dispersions were then knife coated onto the aluminum vapor coated surface of a polyester film to produce coatings having approximately 0.7 to 0.8 gram of solids per 24 square inch area and were allowed to age under dark conditions for at least one week. Each sample was exposed through one of three filters (Wratten 92 red, Wratten 98 blue and Wratten 99 green) and a continuous tone grey wedge. Both exposure and electrolytic development were conducted in apparatus as described in U.S. Patent No. 3,130,655. The electrolytic development was similar to that described for the data in Table I. The resulting visible records of the cintinuous tone wedge were then evaluated in a recording densitometer, the data being recorded in the figure as curves of log relative exposure vs. concentration of dimethylformamide at a density of 0.8. The speeds at a density of 0.8 were compared as a convenient reference point for determining the effectiveness of varying dimethylformamide concentrations. Fog levels and contrast levels were comparable.

Following the procedures set forth above for the data reported in the figure concentrations of 0.25, 0.5, 1.0 and 2.0 milliliters (per 18 grams of zinc oxide) of N,N-diethylformamide; N,N-dimethylacetamide; N,N-dimethylbutyramide and N,N-dibutylformamide were similarly evaluated for their effect on sensitivity. A marked increase in sensitivity was achieved with each material with the exception of N,N-dibutylformamide. Enhanced sensitivity was also observed with N-methylformamide and N-methylacetamide.

The extent of sensitivity enhancement will vary somewhat with different lots of photoconductor, organic binders, pigment to binder ratios, etc., although significant increases were observed in each instance if the above-mentioned carbonyl compounds were introduced into the dye sensitized photoconductive films within the specified concentration limits.

The embodiments of the invention in which an exclusive property or privilege is claimed are defined as follows:

1. An electrophotographic copysheet capable of electrolytic development and having a photoconductive layer comprising dye sensitized inorganic photoconductive particles in an electrically insulating binder on a continuous electrically conductive layer, said photoconductive layer containing for each 18 grams of said dye sensitized inorganic photoconductor particles from 0.25 to 2 milliliters of a carbonyl compound of the formula $$R\overset{O}{\underset{\|}{C}}N\overset{R'}{\underset{R''}{\diagdown}}$$

where R is hydrogen or methyl, R' is hydrogen, methyl or ethyl, and R'' is methyl or ethyl.

2. The copysheet of claim 1 in which said carbonyl compound is dimethylformamide.

3. The copysheet of claim 1 in which said carbonyl compound is diethylformamide.

4. The copysheet of claim 1 in which said carbonyl compound is dimethylacetamide.

5. The copysheet of claim 1 in which said dye sensitized inorganic photoconductive particles are panchromatically sensitized.

6. The copysheet of claim 1 in which said photoconductive particles are zinc oxide.

7. A dispersion comprising a solvent medium, dye sensitized inorganic photoconductive particles, an electrically insulative binder, and from 0.25 to 2 milliliters of a carbonyl compound of the formula $$R\overset{O}{\underset{\|}{C}}N\overset{R'}{\underset{R''}{\diagdown}}$$

where R is hydrogen or methyl, R' is hydrogen, methyl or ethyl, and R'' is methyl or ethyl, for each 18 grams of said inorganic photoconductive particles.

8. The dispersion of claim 7 in which said solvent medium is an organic solvent and said electrically insulating binder is an organic polymer soluble therein.

9. The dispersion of claim 7 in which said carbonyl compound is dimethylformamide.

10. The dispersion of claim 7 in which said carbonyl compound is diethylformamide.

11. The dispersion of claim 7 in which said carbonyl compound is dimethylacetamide.

12. The process of enhancing the photosensitivity of an electrophotographic copysheet capable of electrolytic development which comprises admixing a carbonyl compound of the formula

where R is hydrogen or methyl, R' is hydrogen, methyl or ethyl, and R" is methyl or ethyl, to a dispersion containing inorganic photoconductor particles and an electrically insulating binder, adding dye sensitizer to said dispersion, and preparing an electrolytically developable electrophotographic copysheet therefrom, the amount of said carbonyl compound being from 0.25 to 2 milliliters per 18 grams of said inorganic photoconductor particles.

13. The process of claim 12 in which said dye sensitizer is added to said dispersion prior to the addition of said carbonyl compound.

14. The process of claim 12 in which said dye sensitizer is added to said dispersion simultaneously with said carbonyl compound.

15. The process of claim 12 in which said dye sensitizer is added to said dispersion subsequent to the addition of said carbonyl compound.

References Cited

UNITED STATES PATENTS

| 3,076,752 | 2/1963 | McMaster | 204—18 |
| 3,165,458 | 1/1965 | Harriman | 204—18 |

FOREIGN PATENTS

| 258,665 | 7/1963 | Australia. |

HOWARD S. WILLIAMS, *Primary Examiner*

T. TUFARIELLO, *Assistant Examiner.*